United States Patent
Baldwin et al.

(10) Patent No.: US 8,073,887 B2
(45) Date of Patent: Dec. 6, 2011

(54) REPRESENTATIONAL STATE TRANSFER (REST) SERVICE IMPORT EDITOR

(75) Inventors: Jennifer E. Baldwin, Victoria (CA); Jonathan D. Ball, Ottawa (CA); Elijah El-Haddad, Ottawa (CA); Mihnea Galeteanu, Toronto (CA); Perry R. Giffen, Kemptville (CA); Evgueni Kharlamov, Markham (CA); Han Xu, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 12/248,845

(22) Filed: Oct. 9, 2008

(65) Prior Publication Data
US 2010/0094884 A1    Apr. 15, 2010

(51) Int. Cl.
*G06F 17/30* (2006.01)
(52) U.S. Cl. ........ 707/966; 707/770; 707/E17.032; 709/224
(58) Field of Classification Search .......... 707/966, 707/770, E17.032, 999.107, 999.102, 999.01; 709/204
See application file for complete search history.

(56) References Cited

U.S. PATENT DOCUMENTS

| 7,716,180 B2 * | 5/2010 | Vermeulen et al. | 707/626 |
| 7,747,784 B2 * | 6/2010 | McCarthy et al. | 709/248 |
| 2004/0111502 A1 * | 6/2004 | Oates | 709/223 |

OTHER PUBLICATIONS

Battle et al., Bridging the semantic Web and Web 2.0 with Representational State Transfer (REST), Nov. 17, 2007, pp. 1-12.*
Michael Przybilski, REST—REpresentational State Transfer, Jun. 2, 2006, pp. 1-10.*

* cited by examiner

*Primary Examiner* — Leslie Wong
(74) *Attorney, Agent, or Firm* — Steven M. Greenberg, Esq.; Carey, Rodriguez, Greenberg & O'Keefe

(57) ABSTRACT

In an embodiment of the invention, a method for REST service importation in a distributed application development data processing system can be provided. The method can include the specifying a sample uniform resource locator (URL) in a graphical user interface to a REST service importation editor and invoking the REST service at the sample URL in order to receive a response object from the REST service. The method further can include parsing both the sample URL and the response object to identify different request fields and field types of a request object for the REST service and also response fields and field types of the response object. Finally, the method can include displaying a description of the request fields and field types of the request object and also a description of the response fields and field types of the response object in the graphical user interface to the REST service importation editor.

7 Claims, 2 Drawing Sheets

REPRESENTATIONAL STATE TRANSFER (REST) SERVICE IMPORT EDITOR

BACKGROUND OF THE INVENTION

1. Field of the Invention

The present invention relates to the field of remote service utilization for distributed computing, and more particularly to the remote service invocation of a REST service.

2. Description of the Related Art

Distributed computing refers to the disposition of programmatic elements for a computing application across multiple different computing sources in a computer communications network. Often embodied as part of a Web distributed application, a user interface to the application can be served from one network location, while different portions of program code for an application can be sourced from different locations in the network. Distributed applications enjoy an important advantage of code reuse such that to deploy a robust application, one need not develop the entire application from scratch. Rather, already proven application components can be combined from different sources through a common user interface to deliver the robust application. In this regard, at its extreme form, a distributed application can be nothing more than an aggregation of existing logical components.

Historically, Web services have driven the advancement of distributed computing. A Web service, strictly speaking, is a server-side application exposing a well-defined application programming interface (API) to access the logic of the server-side application. The Web service and its corresponding API can be published in a network accessible directory such that an interested calling application can recognize a proper format for both invoking the logic of the Web service and also for receiving a result from the invocation of the logic of the Web service. In Web services, the format for the request and the response must conform to a defined schema as published in the network accessible directory.

While Web services have proven helpful in the enterprise and have been all the rage for nearly a decade, the utilization of Web services is not without its challenges. For one, interactions with Web services are not cacheable resulting in performance disadvantages and the inability of Web services oriented applications to scale on demand. Further, communication state must be maintained when accessing remotely disposed Web services. Even further, additional protocol handling logic must be layered to enjoy the benefit of Web services, including support for the simple object access protocol (SOAP). Finally, Web services are entirely dependent on a separate and independent resource discovery system—namely the directory.

Realizing the inherent programs in the use of Web services, information technologists have begun to gravitate towards REST services which do not suffer the disadvantages noted herein. As is understood by those skilled in the art, REST refers to a collection of network architecture principles intended to expose access to resources in a stateless manner. The resources are exposed such that clients can access the resources uniformly without requiring knowledge of the whole resource set. In REST, resources are accessed stateless through commonly understood hypertext transfer protocol (HTTP) PUT and GET directives.

The "culture" associated with developers utilizing REST services shuns learning a complex service description language such as the Web Service Definition Language (WSDL) identified with Web services in order to code proper access to a Web service. In fact, at present there is no widely used REST service definition standard though in the past, developers have produced proprietary service definitions for REST. Rather, the culture of the REST technology largely relates to a trial-and-error approach to using a REST service. This trial-and-error approach involves the developer keying a uniform resource locator (URL) into the address field of a Web browser in order to examine the resulting document in the browser.

Based upon the examination of the returned results, the developer can determine the required code in the proper format utilizing proper semantics in order to utilize the REST service from the target application. In addition in order to "import" (use) the REST service within an application, the developer may be required to describe the REST service using a language required by the runtime environment of the application. For example the runtime environment supporting the target application may require that all REST services be described in accordance with a WSDL document.

BRIEF SUMMARY OF THE INVENTION

Embodiments of the present invention address deficiencies of the art in respect to the trial-and-error approach to utilizing a REST service and provide a novel and non-obvious method, system and computer program product for a REST service import editor. In an embodiment of the invention, a method for REST service importation in a distributed application development data processing system can be provided. The method can include the specifying a sample URL in a graphical user interface to a REST service importation editor and invoking the REST service at the sample URL in order to receive a response object from the REST service.

The method further can include parsing both the sample URL and the response object to identify different request fields and field types of a request object for the REST service and also response fields and field types of the response object. Finally, the method can include displaying a description of the request fields and field types of the request object and also a description of the response fields and field types of the response object in the graphical user interface to the REST service importation editor. In one aspect of the embodiment, the method also can include generating a schema for the response object for rendering in the graphical user interface to the REST service importation editor. In this way, a REST service can be called through the use of an editor to analyze the call and to produce a WSDL definition of the REST service without recourse to a defining a proprietary service definition for REST services.

In another embodiment of the invention, a distributed application development data processing system can be provided. The system can include a development environment executing in a host computing platform and configured for communicative coupling to a host server serving responses from a REST service when the REST service is invoked. The system also can include a REST service editor tool coupled to the development environment. The tool can include a graphical user interface and sample URL generator logic. The logic can include program code enabled to create a REST service definition for the REST service at a sample URL for the REST service and to invoke the REST service at the sample URL in order to receive a response object. The program code also can be enabled to parse the response object to identify fields and field types of the response object. Finally, the program code can be enabled to display the sample URL and the field and field types of the response object in the graphical user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for REST service import editor. In accordance with an embodiment of the present invention, a user interface to a distributed application development tool can be rendered to include a field for specifying a sample URL to a REST service. In response to receiving a specified sample URL in the field, a request can be issued by the user interface to a REST service at the sample URL and a response object can be received from the REST service. The response object can be programmatically parsed through the user interface and a sample usage of the REST service can be deduced from the parsed response object. Finally, the sample usage can be rendered in the user interface. Optionally, an object diagram of both a request object for the sample URL and a response object can be generated from the parsed sample URL and the response object and concurrently rendered in the user interface.

Figure 1:
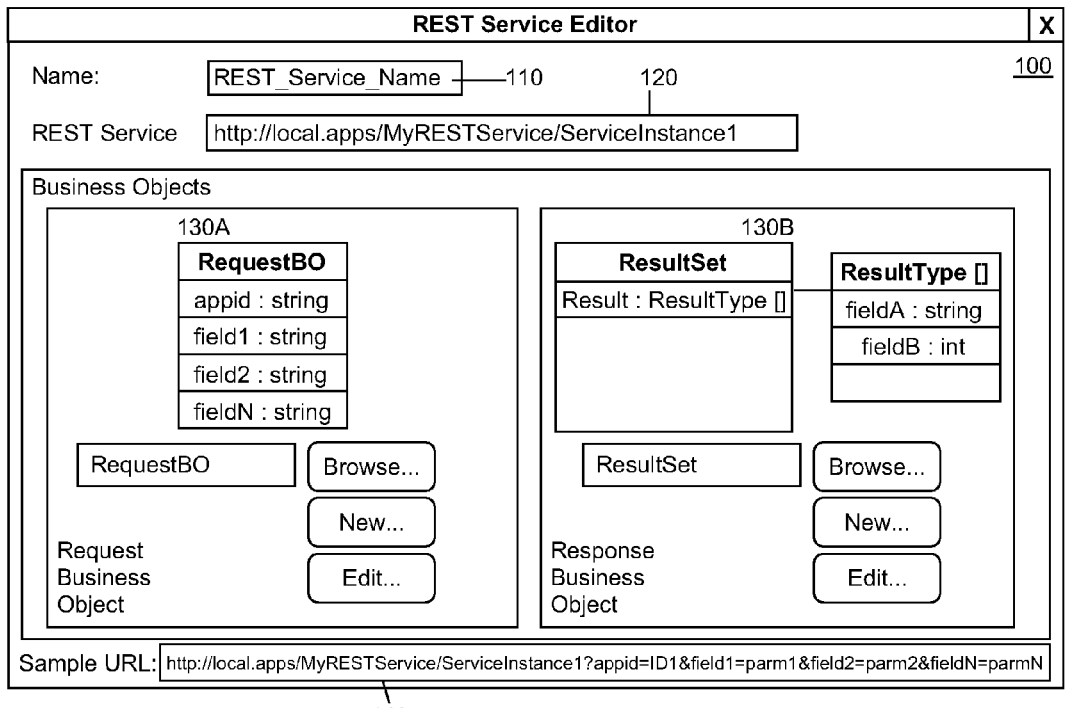
FIG. 1 is a pictorial illustration of a REST service import editor.

In further illustration, FIG. 1 pictorially shows an exemplary REST service import editor consistently arranged according to the inventive embodiments. As shown in FIG. 1, a REST service import editor can include a graphical user interface 100 providing text entry fields 110, 120, 140 into which each of a name for a REST service 110 to be imported can be specified, a path 120 for the REST service, and a sample URL 140 to invoke the REST service can be specified. In response to entering the sample URL 140 for the REST service, coupled logic can issue a request to the REST service at the path 120 and the coupled logic can parse a response object received from the REST service identifying fields and corresponding types of the response object, and also generating a schema for the REST service based upon the response object.

The response object when parsed can indicate the fields and corresponding types to be returned when invoking the REST service. Accordingly, the schema, fields and corresponding types can be used to construct a sample URL 140 for invoking the REST service. Optionally, the sample URL 140 of the request can be parsed in order to construct a description for invoking the REST service and also to deduce a response schema definition for the REST service definition. Specifically, an object diagram of the request object 130A for the sample URL 140 and an object diagram of the response object 130B can be generated from the parsed sample URL 140 and the response object and concurrently rendered in the graphical user interface 100.

Figure 2:
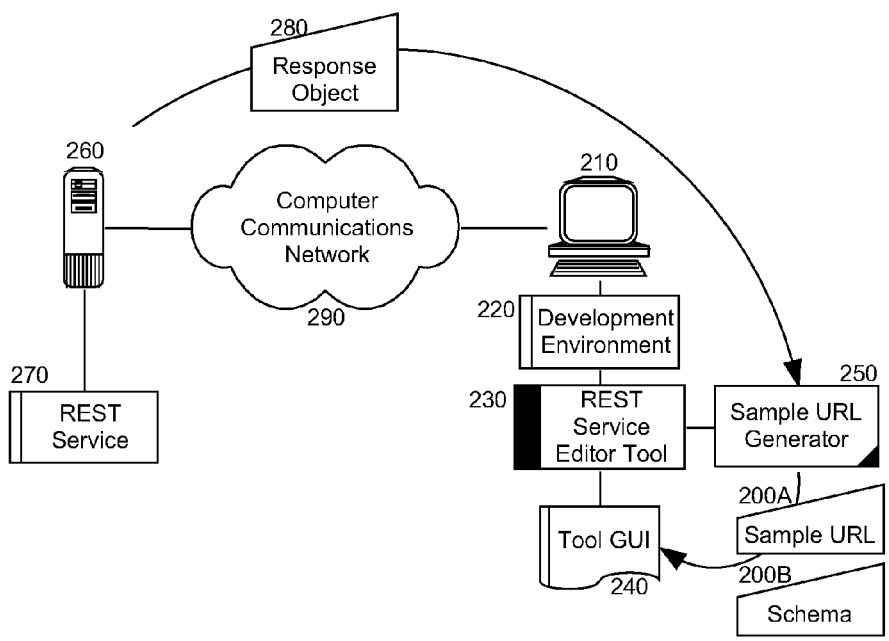
FIG. 2 is a schematic illustration of a distributed application development data processing system configured with a REST service import editor; and, FIG. 3 is a flow chart illustrating a process for REST service importation in a distributed application development data processing system.

The graphical user interface 100 of the REST service import editor of FIG. 1 can be driven by a distributed application development data processing system. In yet further illustration, FIG. 2 schematically shows a distributed application development data processing system configured with a REST service import editor. The system can include a host computing platform 210 supporting the operation of a development environment 220 through which distributed applications are developed. A REST service editor tool 230 can be coupled to the development environment 220. In this regard, the REST service editor tool 230 can provide a graphical user interface 240 providing end user to the REST service editor tool 230. Further, sample URL generator logic 250 can be coupled to the REST service editor tool 230 and can include program code enabled to issue a request through the graphical user interface 240 to access the REST service 270 at a specified sample URL in order to receive a response object 280 from the REST service 270.

More particularly, in operation, an end user can specify through the graphical user interface 240 a sample URL for the REST service 270 executing in a host server 260. The REST service editor tool 230 in response can access a REST service 270 at the sample URL in the host server 260 resulting in the REST service 270 responding with a response object 280. The program code of the sample URL generator logic 250 when executed in the host computing platform 210 can parse the response object 280 in order to identify the requisite field and field types resulting when invoking the REST service 270. Further, the program code of the sample URL generator logic 250 when executed in the host computing platform 210 can create a schema 200B for the response object 280 produced by the REST service 270 in response to the invocation of the REST service 270. Finally, the program code of the sample URL generator logic 250 when executed in the host computing platform 210 can assemble the identified field and field types of the response object 2080 and can insert the field and field types into the graphical user interface 240 for viewing by an end user.

Figure 3:
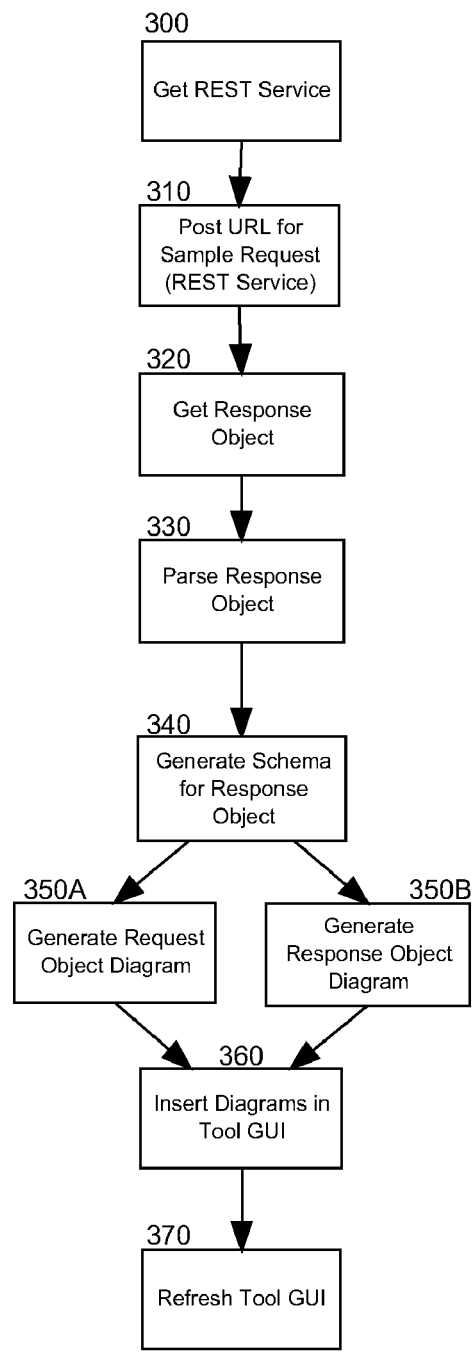

In even yet further illustration of the operation of the REST service editor tool 230, FIG. 3 is a flow chart illustrating a process for REST service importation in a distributed application development data processing system. Beginning in block 300, a path to a REST service can be specified in the tool and in block 310, a sample (exemplary) request (in the form of a URL) to invoke the REST service can be issued. In block 320, a response object can be received in response to the sample request and in block 330, the response object can be parsed to identify field and field values returned when invoking the REST service.

In block 340, a schema for the response object provided by the REST service can be generated for the REST service. In consequence, in block 350A not only can a visual diagram be generated for a request object for the REST service based upon identified field and field types in the sample request, but also in block 350B a visual diagram can be generated for the response object based upon the identified field and field types. Subsequently, in block 370 the graphical user interface can be refreshed to display the request and response object diagrams.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for representational state transfer (REST) service importation in a distributed application development data processing system, the method comprising:
specifying a sample uniform resource locator (URL) for a REST service through a graphical user interface to a REST service importation editor;
invoking the REST service with the sample URL in order to receive a response object from the REST service;
parsing both the sample URL and the response object to identify different request fields and field types of a request object for the REST service and also response fields and field types of the response object; and,
displaying a description of the request fields and field types of the request object and also a description of the response fields and field types of the response object in the graphical user interface to the REST service importation editor.

2. The method of claim 1, further comprising generating a schema for the response object for rendering in the graphical user interface to the REST service importation editor.

3. A distributed application development data processing system comprising:
a development environment executing in a host computing platform and configured for communicative coupling to a host server serving responses from a representational state transfer (REST) service when the REST service is invoked; and,
a REST service editor tool coupled to the development environment, the tool comprising a graphical user interface and sample uniform resource locator (URL) generator logic, the logic comprising program code enabled to:
(1) create a REST service definition for the REST service at a sample URL for the REST service and to invoke the REST service at the sample URL in order to receive a response object,
(2) to parse the response object to identify fields and field types of the response object, and,
(3) to display the sample URL and the field and field types of the response object in the graphical user interface.

4. The system of claim 3, wherein the program code is further enabled:
(4) to parse the sample URL to identify different request fields and field types of a request object, and
(5) to display the field and field types of the request object in the graphical user interface.

5. The system of claim 3, wherein the program code is further enabled to generate a schema for the response object for rendering in the graphical user interface.

6. A computer program product comprising a computer usable storage medium storing computer usable program code for representational state transfer (REST) service importation in a distributed application development data processing system, the computer program product comprising:
computer usable program code for specifying a sample uniform resource locator (URL) through a graphical user interface to a REST service importation editor;
invoking the REST service with the sample URL in order to receive a response object from the REST service;
parsing both the sample URL and the response object to identify different request fields and field types of a request object for the REST service and also response fields and field types of the response object; and,
computer usable program code for displaying a description of the request fields and field types of the request object and also a description of the response fields and field types of the response object in the graphical user interface to the REST service importation editor.

7. The computer program product of claim 6, further comprising computer usable program code for generating a schema for the response object for rendering in the graphical user interface to the REST service importation editor.

* * * * *